Nov. 14, 1944.   F. R. CLEMENT   2,362,615
COMPARATOR
Filed Nov. 12, 1941

INVENTOR:
FREDERICK ROY CLEMENT
BY: Francis E. Boyce
ATTORNEY

Patented Nov. 14, 1944

2,362,615

UNITED STATES PATENT OFFICE 2,362,615

COMPARATOR

Frederick Roy Clement, Coventry, England

Application November 12, 1941, Serial No. 418,779
In Great Britain January 29, 1941

1 Claim. (Cl. 33—148)

The invention relates to comparators adapted to be used as precision measuring instruments in the manufacture and/or inspection of engineering products, more particularly those possessing a series of splines or serrations.

A serrated shaft is fundamentally the same as a spur gear, differing mostly as regards the tooth form. It will be agreed that two of the most important elements are, the pitch diameter and the angular disposition of the serrations or teeth.

Accuracy of spacing is more easily attained in the case of a spur gear, by virtue of its generation when same has been hobbed; this also applies to serrated shafts when their design is such that the serrations are continuous around the shaft periphery.

However, many conditions exist where it is essential to leave one serration uncut, thereby ensuring that the mating component may only be assembled in a predetermined position, a typical example being the airscrew shaft of an aero engine.

The production of a serrated shaft with one serration to be left uncut, by a generation or hobbing process is impracticable, with the result that the single indexing method must be used.

By the use of an optical dividing head in conjunction with a jig-boring machine, it is possible to manufacture the indexing plate of a fixture, to within extremely fine limits. The results obtained while the fixture is in a new condition may be extremely satisfactory. Unfortunately, when the bushes and the indexing plunger wear, which of course is inevitable, the accuracy of the spacing of serrations is at once questionable.

It is therefore obvious that the method of inspection of the two elements, i. e., pitch diameter and chordal spacing, during and after the machining operations which produce the serrations of an airscrew shaft, is of vital importance.

The objects of the invention are, inter alia, to provide an instrument of the above kind such as will obviate the use of a micrometer caliper and rollers in the manufacture and/or inspection of engineering products possessing splines or serrations and will measure or compare the splines or serrations, either diametrically or chordally, with a result that an instrument having a high degree of efficiency is produced.

The frame or main body of the comparator as well as the pivoted arm, carries either one or more spaced rollers or balls, or a combination of both, which provide contact means for application to the work-piece.

The comparator, when in use, is in a state of tensional or partly tensional and partly compressional stress.

The main body of the comparator may be made of any suitable light strong material, while the various parts may also be made from materials which are technically considered to be most suitable.

In order that the invention may be clearly understood, reference is directed to the accompanying drawing wherein.

Figure 1:
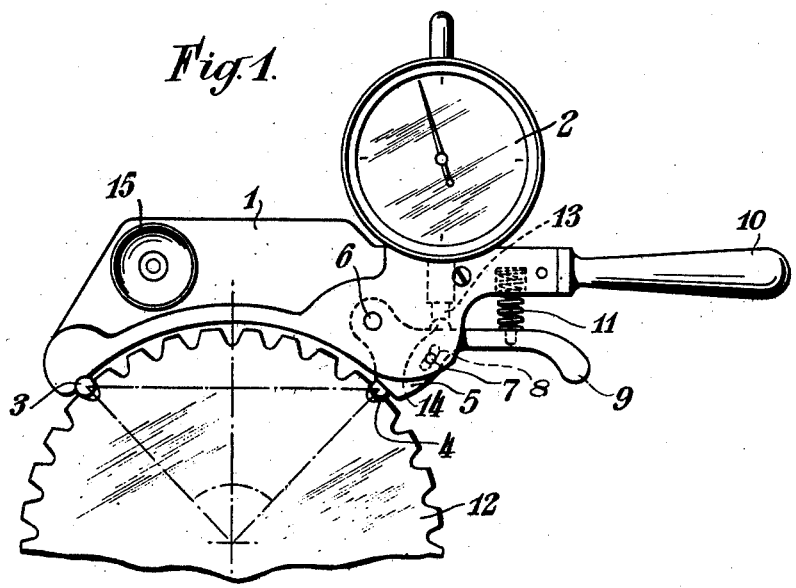
Figure 1 is a front elevation of a comparator constructed in accordance with the invention and shown in use when taking a chordal measurement.

Referring to the figures of the drawing, the comparator illustrated comprises a main frame 1 to which is attached a visual indicator 2 by means of which the measurements determined by the comparator are ascertained. The main frame 1 carries a pair of spaced elements or contact means which in the example shown consist of a roller 3 at the forward end of the frame 1 and a ball 4 at the rear end of the frame 1. The ball 4 is mounted on a lever 5 which is pivoted at 6 to the main frame 1, the lever 5 being conveniently mounted between cheeks and controlled as to its limits of movement by means of a stop 7 operating in conjunction with a slot 8 as in Figure 1, in Figure 2 the construction comprising a pin 7 and recess 8. The lever 5 is extended in the form of a trigger arm 9 which, together with a handle 10 forming part of the frame 1, provides a grip for the device. The trigger 9 is movable against the action of a spring 11 to enable the comparator to be placed in position with its contact means upon a work-piece such as 12 in order that the chordal dimension thereof may be ascertained and the lever 5 is operatively associated with the visual indicator 2 through the intermediary of a plunger 13 forming part of the mechanism of the indicator and an abutment 14 secured to the trigger arm 9.

Figure 2:
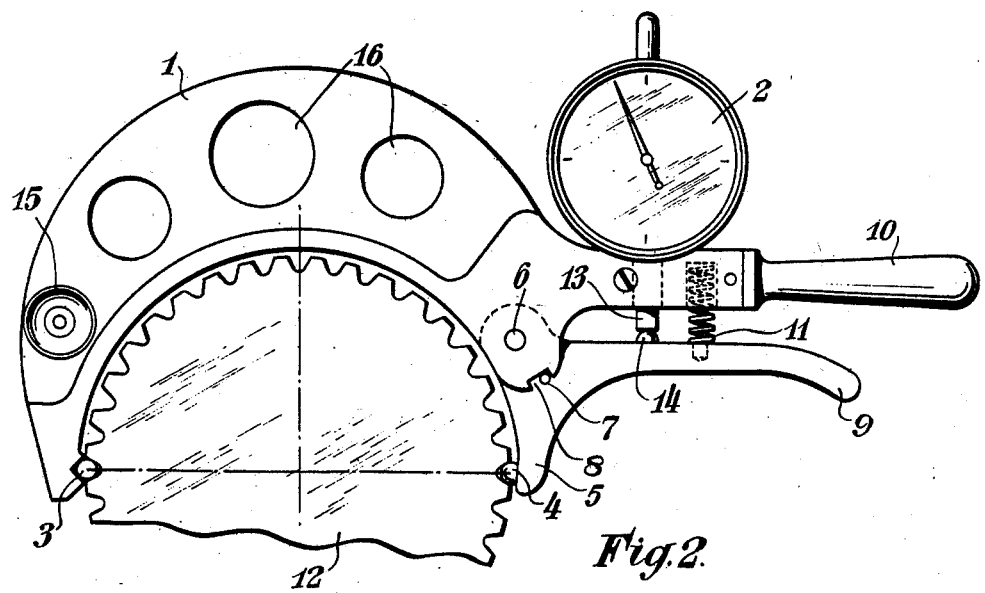
Figure 2 is a similar view to Figure 1 showing an instrument embodying certain slight modifications and in use when taking measurements diametrically.

Figure 2 is a similar view to Figure 1, the same reference numerals being used for similar parts thereof, the construction being such that it is used for obtaining diametrical measurements of a work-piece 12.

The main frame 1 is preferably provided with a finger piece 15 to assist in manipulating the device when placing it in position for measuring purposes. In addition, the frame as indicated in Fig. 2 may be reduced in weight by providing perforations as at 16, and certain other modifications of the invention are possible, for example, in place of the roller 3 and ball 4 a pair of rollers would be employed or a pair of balls, or a combination of both. Further, the spring 11 could be replaced by other resilient means which are preferably so calibrated that the pressure on the work-piece is adequate for the delicacy of the operation being performed.

It will be appreciated that the invention provides a comparator which eliminates the usual method of checking chordal and diametrical measurements, namely, the use of a pair of measuring wires (of correct diameter to make pitch line contact) held in position by means of a rubber band and positioned diametrically opposite for the pitch diameter check, or a specified number of serrations apart, for the chordal check; a micrometer caliper, graduated in tenths of thousandths of an inch, being used to obtain a "measurement."

This method, apart from the tremendous waste of time, to say nothing of the physical and mental fatigue involved, is not any too accurate because few individuals have the same "feel" with a micrometer, particularly when the object they are measuring is awkwardly situated, opinion may be the cause of holding up production—a very serious matter in normal times, but which the present invention eliminated, as the comparator described is capable of giving a consistent and positive indication of conditions when placed in the hands of unskilled female labour. Simplicity combined with efficiency has been the primary factor of the design of the present invention which provides a comparator which will consistently repeat its readings over any one dimension irrespective of the number and different types of persons conducting the test.

Master setting gauges may be employed for initial setting of the comparator, although a section of a serrated component, of a known pitch diameter and chordal spacing may be used for the initial and subsequent re-setting of the serration comparator gauges in accordance with the invention. The illustrated shape of the comparator enables one to obtain a maximum rigidity which, combined with the resultant uniform displacement of weight and measuring pressure, enables the instrument to be applied to a work-piece where it can function without requiring to be manually held in position, thus eliminating measuring inaccuracies which otherwise would be present due to the human element, with the result that comparative measuring accuracy is accomplished to a very high degree of precision.

The positioning of the trigger arm enables the automatic maintenance of the instrument in a state of equilibrium whilst in use.

The contact means employed facilitates the use of the instrument to provide an effective means of checking the alignment of the splines, serrations or teeth of same.

What I claim and desire to secure by Letters Patent is:

A comparator, comprising an arcuately recessed frame, a lever pivotally mounted on said frame adjacent one end of its arcuate recess, cooperating means carried by said frame and lever for limiting the pivotal movement of the lever, a roller carried by said frame at the end of its arcuate recess opposite from the lever, a ball carried by said lever, said roller and ball projecting beyond the supporting portions of the frame and lever respectively and disposed in position to make contact with the surface of an article at the extremities of the distance thereon to be measured, a handle carried by said frame, a visual measurement indicator mounted on said frame, a trigger arm extending from said lever in parallel relation to said handle, resilient means disposed between said trigger and handle for maintaining them normally separated, and plunger mechanism disposed between said indicator and trigger for operation by movement of the trigger to actuate said indicator.

FREDERICK ROY CLEMENT.